US012617968B2

(12) United States Patent
Bony et al.

(10) Patent No.: US 12,617,968 B2
(45) Date of Patent: May 5, 2026

(54) OSIDIC DISPERSING AGENT

(71) Applicant: COATEX, Genay (FR)

(72) Inventors: Francis Bony, Quincieux (FR); Morgane Le Neindre, Villeurbanne (FR); Benoit Magny, Cailloux sur Fontaines (FR); Yves Matter, Reyrieux (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 779 days.

(21) Appl. No.: 17/291,781

(22) PCT Filed: Nov. 14, 2019

(86) PCT No.: PCT/FR2019/000185

§ 371 (c)(1),
(2) Date: May 6, 2021

(87) PCT Pub. No.: WO2020/099736

PCT Pub. Date: May 22, 2020

(65) Prior Publication Data

US 2022/0025203 A1 Jan. 27, 2022

(30) Foreign Application Priority Data

Nov. 16, 2018 (FR) ...................................... 1871564

(51) Int. Cl.

| | |
|---|---|
| ***C09D 17/00*** | (2006.01) |
| ***C08F 20/06*** | (2006.01) |
| ***C08F 20/28*** | (2006.01) |
| ***C08F 22/02*** | (2006.01) |
| ***C08K 3/22*** | (2006.01) |
| ***C08K 3/26*** | (2006.01) |
| ***C08K 3/34*** | (2006.01) |
| ***C08K 5/1545*** | (2006.01) |
| ***C09D 7/43*** | (2018.01) |
| ***C09D 7/45*** | (2018.01) |
| ***C09D 7/61*** | (2018.01) |
| ***C09D 7/65*** | (2018.01) |
| ***D21H 19/38*** | (2006.01) |
| ***D21H 19/40*** | (2006.01) |
| ***D21H 19/58*** | (2006.01) |

(52) U.S. Cl.

CPC ............ *C09D 17/001* (2013.01); *C08F 20/06* (2013.01); *C08F 20/28* (2013.01); *C08F 22/02* (2013.01); *C08K 3/22* (2013.01); *C08K 3/26* (2013.01); *C08K 3/346* (2013.01); *C08K 5/1545* (2013.01); *C09D 7/43* (2018.01); *C09D 7/45* (2018.01); *C09D 7/61* (2018.01); *C09D 7/65* (2018.01); *C09D 17/008* (2013.01); *D21H 19/385* (2013.01); *D21H 19/40* (2013.01); *D21H 19/58* (2013.01); *C08K 2003/2241* (2013.01); *C08K 2003/265* (2013.01); *C08K 2201/005* (2013.01)

(58) Field of Classification Search

CPC .......... C09D 17/001; C09D 7/43; C09D 7/45; C09D 7/61; C09D 7/65; C09D 17/008; C09D 7/63; C09D 11/03; C09D 17/004; C08F 20/06; C08F 20/28; C08F 22/02; C08F 120/06; C08K 3/22; C08K 3/26; C08K 3/346; C08K 5/1545; C08K 2003/2241; C08K 2003/265; C08K 2201/005; D21H 19/385; D21H 19/40; D21H 19/58; D21H 17/06; D21H 17/37; D21H 17/71; D21H 19/20; D21H 19/44; D21H 19/46; C08L 33/02

See application file for complete search history.

(56) References Cited

U.S. PATENT DOCUMENTS

| | | | | |
|---|---|---|---|---|
| 4,801,354 | A | 1/1989 | Hirsch et al. | |
| 9,120,948 | B2 * | 9/2015 | Shimanaka | C08F 293/005 |
| 11,196,005 | B2 * | 12/2021 | Mitchell | H10K 30/30 |
| 2006/0122322 | A1 * | 6/2006 | Chrisstoffels | C08F 26/02 524/804 |
| 2009/0170982 | A1 * | 7/2009 | Dupont | D21H 19/58 524/556 |
| 2009/0209692 | A1 | 8/2009 | Suau et al. | |
| 2016/0236163 | A1 | 8/2016 | Champagne et al. | |
| 2017/0204305 | A1 * | 7/2017 | Houillot | C09J 103/02 |
| 2020/0255669 | A1 | 8/2020 | Champagne et al. | |

FOREIGN PATENT DOCUMENTS

| | | | | |
|---|---|---|---|---|
| FR | 2 903 618 | A1 | 1/2008 | |
| WO | WO-2012028627 | A1 * | 3/2012 | C09D 151/06 |
| WO | WO-2012117017 | A1 * | 9/2012 | C08J 5/00 |
| WO | WO 2015/063402 | A1 | 5/2015 | |
| WO | WO 2018/109400 | A1 | 6/2018 | |

OTHER PUBLICATIONS

Krüger, WO2012117017-MT (Year: 2012).*
Balk, WO-2012028627-MT (Year: 2012).*
International Search Report issued on Feb. 18, 2021 in PCT/FR2019/000185 filed on Nov. 14, 2019, 2 pages.

* cited by examiner

*Primary Examiner* — Mark Eashoo
*Assistant Examiner* — Zhen Liu
(74) *Attorney, Agent, or Firm* — Oblon, McClelland, Maier & Neustadt, L.L.P.

(57) ABSTRACT

A dispersing agent may be suitable for an aqueous composition, in particular for dispersing a mineral material in the form of particles. Such a dispersing agent may include a dispersing polymer combined with an osidic derivative or a derivative of saccharide origin. An aqueous composition may include such a dispersing agent and a mineral material in the form of particles.

20 Claims, No Drawings

OSIDIC DISPERSING AGENT

CROSS-REFERENCE TO RELATED APPLICATIONS

The present application is the national stage of international application PCT/FR2019/000185, filed on Nov. 14, 2019, and claims the benefit of the filing date of French Appl. No. 1871564, filed on Nov. 16, 2018.

DESCRIPTION

The invention relates to the field of dispersing agents for an aqueous composition, in particular for dispersing a mineral material in particle form. The dispersing agent according to the invention comprises a dispersing polymer combined with an osidic derivative or a saccharide derivative. The invention also relates to an aqueous composition comprising said dispersing agent and a mineral material in particle form, as well as to the use of said agent or of said composition.

An aqueous suspension of a mineral material is a dispersion of slightly soluble or insoluble solid material in an aqueous medium. The desired characteristics of a suspension generally depend on the intended use of this suspension, in particular the use of the mineral material as filler in a composition, for example in a paper coating colour composition or a coating composition.

The characteristics of an aqueous dispersion of mineral material in particle form can be controlled, in particular by means of a dispersing agent.

The viscosity and stability of the aqueous dispersion are important properties.

The origins and properties of the dispersing agents of mineral material in particle form can vary widely. In particular, this agent can be prepared from products of natural origin.

It must therefore be possible to develop the use of renewable products.

The compatibility of the dispersing agents, in particular with the various elements present in an aqueous dispersion of mineral material in particle form, is also an important property.

There are known dispersing agents of mineral material in particle form. However, the known agents do not make it possible to provide satisfactory solutions to the problems encountered when dispersing these materials in an aqueous medium.

In particular, dispersing agents do not always have degradation properties, particularly improved biodegradation properties.

Dispersing agents must also have a controlled apparent viscosity to facilitate their handling, transport or introduction into an aqueous composition.

The reduction of the amounts of admixtures, in particular of dispersing polymers, particularly of synthetic dispersing polymers, used in aqueous compositions must also be sought.

Document EP 2044159 describes a method for manufacturing an aqueous suspension of mineral materials using an acrylic acid or methacrylic acid polymer and maleic anhydride. Document U.S. Pat. No. 4,801,354 describes aqueous suspensions of pigments for use in paper manufacturing. They contain a dispersant which is a copolymer of a (meth) acrylic acid ester and of a monohydric or dihydric alcohol as well as of a carboxylic acid. Document WO 2018-109400 describes a method for preparing particles of mineral material by grinding in the presence of water and of a polymer prepared from at least one anionic monomer and sodium hypophosphite or di sodium 2,2'-(thiocarbonylbisthio)dipropanoate. Document WO 2015-063402 relates to the use of a depolymerised carboxylated cellulose solution for grinding or dispersing aqueous suspensions of mineral material.

The dispersing agent according to the invention makes it possible to provide a solution to all or part of the problems encountered when using dispersing agents from the prior art.

Thus, the invention provides an aqueous dispersing agent comprising:

- at least one polymer (P) prepared by at least one radical polymerisation reaction, at a temperature greater than 50° C., of at least one anionic monomer (M1) comprising at least one polymerisable olefinic unsaturation and at least one carboxylic acid group or of one of its salts, in the presence of at least one radical-generating compound chosen among hydrogen peroxide, benzoyl peroxide, acetyl peroxide, lauryl peroxide, tert-butyl hydroperoxide, cumene hydroperoxide, ammonium persulphate, an alkali metal persulphate, an azo compound, their respective combinations and associations with an ion chosen among $Fe^{II}$, $Fe^{III}$, $Cu^{I}$, $Cu^{II}$ and combinations thereof;
- at least one derivative (S) chosen among:
  - an ose (S1) comprising from 3 to 8 carbon atoms;
  - an ose oligomer (S2) comprising from 1 to 10 ose units;
  - a product (S3) resulting from the degradation of a saccharide.

According to the invention, the polymer (P) is prepared by at least one radical polymerisation reaction in the presence of at least one radical-generating compound. This compound may in particular be an azo compound, for example an azo compound chosen among 2,2'-azobis(2-(4,5-dihydroimidazolyl)propane, 2,2'-azobis(2-methylpropionamidine) dihydrochloride, diazo-valeronitrile, 4,4'-azobis-(4-cyanovaleric acid), AZDN or 2,2'-azobisisobutyronitrile.

Preferably, according to the invention, the radical-generating compound is chosen among hydrogen peroxide and alkali metal persulphates, in particular sodium persulphate and potassium persulphate.

In addition to a radical-generating compound, the polymerisation reaction can also use at least one compound comprising phosphorus in the oxidation I state. Preferably, this phosphorus in the oxidation I state is a compound chosen among hypophosphorous acid ($H_3PO_2$) and a derivative of hypophosphorous acid ($H_3PO_2$). Even more preferably, this compound is a compound comprising at least one hypophosphite ion $$(H_2PO_2^-).$$

More preferentially, this compound is chosen among sodium hypophosphite ($H_2PO_2Na$), potassium hypophosphite ($H_2PO_2K$), calcium hypophosphite ($[H_2PO_2]_2Ca$) and combinations thereof.

According to the invention, the polymerisation reaction can also be carried out in the presence of at least one compound comprising a bisulphite ion, preferably a compound chosen among ammonium bisulphite, an alkali metal bisulphite, in particular sodium bisulphite, potassium bisulphite, calcium bisulphite, magnesium bisulphite and combinations thereof.

According to the invention, the polymerisation reaction can also be carried out in the presence of at least one compound comprising phosphorus in the oxidation III state, preferably a compound chosen among phosphorous acid and a phosphorous acid derivative. More preferentially, this compound comprises at least one phosphite ion, in particular a compound chosen among sodium phosphite, calcium phosphite, potassium phosphite, ammonium phosphite and combinations thereof.

According to the invention, the polymerisation reaction can also be carried out in the presence of between 0.05 and 5% by weight, relative to the total amount of monomers, of at least one compound chosen among a xanthate derivative, a mercaptan compound and a compound of formula (I):

(I)

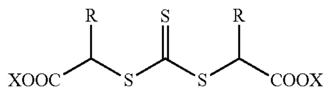

wherein:

X independently represents H, Na or K,

R independently represents a $C_1$-$C_3$-alkyl group, preferably a methyl group. Preferably according to the invention, the compound of formula (I) is disodium 2,2'-(thiocarbonylbisthio)dipropanoate (DPTTC).

According to the invention, the polymerisation reaction can also be carried out in the presence of at least one reducing compound, for example a compound chosen among hydroxylamine sulphate, hydrazine hydrate and combinations thereof.

According to the invention, the polymerisation reaction is carried out at a temperature greater than 50° C., in particular at atmospheric pressure and at a temperature ranging from 50 to 98° C. or from 75 to 99° C. Preferably, the polymerisation reaction is carried out from 50 to 95° C. or from 50 to 85° C. The polymerisation reaction may also be carried out at a pressure greater than atmospheric pressure and at a temperature greater than 100° C., preferably less than 140° C.

According to the invention, the polymerisation reaction is carried out in water, in a solvent, alone or in a mixture with water, particularly an alcoholic solvent, in particular isopropyl alcohol. Preferably, it is carried out in water.

Preferably according to the invention, the polymer (P) is completely or partially neutralised, in particular at the end of the polymerisation reaction.

More preferentially, the polymer (P) is neutralised using at least one derivative chosen among an alkali metal, an alkaline-earth metal, an amine derivative, ammoniac, ammonia and combinations thereof. More preferentially, the polymer (P) is neutralised using a derivative comprising at least one element chosen among lithium, sodium, calcium, magnesium and combinations thereof, for example NaOH, KOH, $Ca(OH)_2$, $Mg(OH)_2$, an amine derivative chosen among monoisopropylamine (AMP), triethylamine, diethylamine, monoethylamine and combinations thereof.

Sodium, calcium and combinations thereof are particularly preferred. Neutralisation with sodium and calcium can therefore be carried out using at least one compound chosen among NaOH, KOH, $Ca(OH)_2$ $Mg(OH)_2$ and combinations thereof. The respective proportions of sodium and of calcium can vary quite widely. For example, the Na/Ca molar ratio can range from 98/2 to 30/70, preferably from 95/5 to 40/60, more preferentially from 90/10 to 30/70 or from 90/10 to 40/60, even more preferentially from 70/30 to 40/60, particularly 50/50.

Preferably according to the invention, the anionic monomer (M1) comprising at least one polymerisable olefinic unsaturation comprises one or two carboxylic acid groups. More preferentially, it includes a single carboxylic acid group. Even more preferentially, it is chosen among acrylic acid, methacrylic acid, an acrylic acid salt, a methacrylic acid salt, itaconic acid, an itaconic acid salt and combinations thereof. The preferred monomer (M1) is acrylic acid.

According to the invention, the polymerisation reaction can use one or several monomers (M1). Another anionic monomer (M1) can thus be chosen among acrylic acid, methacrylic acid, itaconic acid, maleic acid, maleic anhydride and combinations thereof. According to the invention, the polymerisation reaction can use, relative to the total amount by weight of monomers:

100% by weight of anionic monomer (M1) or from 50% to 99.5% or from 70% to 99.5% by weight of anionic monomer (M1) and, respectively, from 0.5% to 50% or from 0.5% to 30% by weight of at least one other monomer.

In addition to the monomer (M1), the polymerisation reaction can therefore also use at least one nonionic monomer (M2) comprising at least one polymerisable olefinic unsaturation, preferably at least one polymerisable ethylenic unsaturation and in particular a polymerisable vinyl group.

More preferentially, the nonionic monomer (M2) is chosen among styrene, vinylcaprolactam, the esters of an acid comprising at least one monocarboxylic acid group, in particular an ester of an acid chosen among acrylic acid, methacrylic acid and combinations thereof, for example hydroxyethyl acrylate, hydroxypropyl acrylate, hydroxyethyl methacrylate, hydroxypropyl methacrylate, alkyl acrylate, in particular $C_1$-$C_{10}$-alkyl acrylate, preferentially $C_1$-$C_4$-alkyl acrylate, more preferentially methyl acrylate, ethyl acrylate, propyl acrylate, isobutyl acrylate, n-butyl acrylate, alkyl methacrylate, particularly $C_1$-$C_{10}$-alkyl methacrylate, preferentially $C_1$-$C_4$-alkyl methacrylate.

Even more preferentially, it is chosen among methyl methacrylate, ethyl methacrylate, propyl methacrylate, isobutyl methacrylate, n-butyl methacrylate, aryl acrylate, preferably phenylacrylate, benzylacrylate, phenoxyethylacrylate, aryl methacrylate, preferably phenyl methacrylate, benzyl methacrylate, phenoxyethyl methacrylate.

According to the invention, the polymerisation reaction can also use at least one monomer (M3) chosen among 2-acrylamido-2-methylpropanesulphonic acid, a 2-acrylamido-2-methylpropanesulphonic acid salt, 2-(methacryloyloxy)ethanesulphonic acid, a 2-(methacryloyloxy)ethanesulphonic acid salt, sodium methallyl sulphonate, styrene sulphonate, hydroxyethyl-acrylate phosphate, hydroxypropyl-acrylate phosphate, hydroxyethyl methacrylate phosphate, hydroxypropyl-methacrylate phosphate and combinations and mixtures thereof.

The preferred monomer (M3) is chosen among 2-acrylamido-2-methylpropanesulphonic acid and a 2-acrylamido-2-methylpropanesulphonic acid salt.

According to the invention, the polymerisation reaction can also use at least one monomer (M4) of formula (II):

(II)

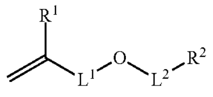

wherein:

$R^1$ and $R^2$, identical or different, independently represent H or $CH_3$, $L^1$ independently represents a group chosen among C(O), $CH_2$, $CH_2—CH_2$ and $O—CH_2—CH_2—CH_2—CH_2$, $L^2$ independently represents a group chosen among $(CH_2—CH_2O)$, $(CH_2CH(CH_3)O)_y$, $(CH(CH_3)CH_2O)_z$ and combinations thereof and x, y and z, identical or different, independently represent an integer or decimal comprised in a range from 0 to 150 and the sum of x+y+z is comprised in a range from 10 to 150.

According to the invention, the polymerisation reaction can also use at least one compound (M5) of formula (III):

$$R^1\text{-}(EO)_m\text{—}(PO)\text{—}R^2 \quad \text{(III)}$$

wherein:

m and n, identical or different, independently represent 0 or an integer or decimal less than 150, m or n being different from 0, EO represents a $CH_2CH_2O$ group, PO independently represents a group chosen among $CH(CH_3)CH_2O$ and $CH_2CH(CH_3)O$, $R^1$ represents a group comprising at least one polymerisable olefinic unsaturation, preferably a group chosen among acrylate, methacrylate, acryl urethane, methacryl urethane, vinyl, allyl, methallyl and isoprenyl, more preferentially a methacrylate group, $R^2$ represents a straight, branched or cyclical, saturated, unsaturated or aromatic hydrocarbon group comprising from 6 to 40 carbon atoms, preferably a straight or branched $C_6$-$C_{40}$ alkyl group, preferably a straight or branched $C_8$-$C_{30}$ alkyl group, a $C_6$-$C_{40}$ aryl group, preferably a $C_8$-$C_{30}$ aryl group, for example a tristyryl phenyl group. According to the invention, the polymerisation reaction can also use at least one monomer (M6) chosen among:

polyalkylene glycol acrylate, preferably polyethylene glycol acrylate or polyethylene-polypropylene glycol acrylate, polyalkylene glycol methacrylate, preferably polyethylene glycol methacrylate or polyethylene-polypropylene glycol methacrylate, allyl polyalkylene glycol, preferably allyl polyethylene glycol or allyl polyethylene-polypropylene glycol, methallyl polyalkylene glycol, preferably methallyl polyethylene glycol or methallyl polyethylene-polypropylene glycol, 3-methyl-3-buten-1-ylpolyalkylene glycol, preferably 3-methyl-3-buten-1-ylpolyethylene glycol or 3-methyl-3-buten-1-ylpolyethylene-polypropylene glycol, polyalkylene glycol acrylate phosphate, preferably polyethylene glycol acrylate phosphate or polyethylene-polypropylene glycol acrylate phosphate, polyalkylene glycol methacrylate phosphate, preferably polyethylene glycol methacrylate phosphate or polyethylene-polypropylene glycol methacrylate phosphate, allyl polyalkylene glycol phosphate, preferably allyl polyethylene glycol phosphate or allyl polyethylene-polypropylene glycol phosphate, methallyl polyalkylene glycol phosphate, preferably methallyl polyethylene glycol phosphate or ethallyl polyethylene-propylene glycol phosphate, 3-methyl-3-buten-1-ylpolyalkylene glycol phosphate, preferably 3-methyl-3-buten-1-ylpolyethylene glycol phosphate or 3-methyl-3-buten-1-ylpolyethylene-polypropylene glycol phosphate.

According to the invention, the polymerisation reaction can also use at least one monomer (M7) chosen among a cross-linking compound and a monomer comprising at least two olefinic unsaturations.

According to the invention, in addition to one or several monomers (M1), the polymerisation reaction can also use one or several monomers (M2) to (M7) as well as different combinations thereof. Particularly preferred polymers according to the invention are chosen among:

homopolymers prepared by polymerisation reaction using a single monomer (M1), preferably acrylic acid or an acrylic acid salt or itaconic acid or an itaconic acid salt, copolymers prepared by polymerisation reaction using two monomers (M1), preferably acrylic acid and methacrylic acid; an acrylic acid salt and methacrylic acid; acrylic acid and maleic acid; an acrylic acid salt and maleic acid; acrylic acid and maleic anhydride; an acrylic acid salt and maleic anhydride, copolymers prepared by polymerisation reaction using three monomers (M1), preferably acrylic acid, methacrylic acid and itaconic acid; an acrylic acid salt, methacrylic acid and itaconic acid, copolymers prepared by polymerisation reaction using a monomer (M1) and a monomer (M2); preferably acrylic acid and ethyl acrylate; an acrylic acid salt and ethyl acrylate; acrylic acid and butyl acrylate; an acrylic acid salt and butyl acrylate; acrylic acid and hydroxypropyl acrylate; an acrylic acid salt and hydroxypropyl acrylate; acrylic acid and hydroxypropyl methacrylate; an acrylic acid salt and hydroxypropyl methacrylate, copolymers prepared by polymerisation reaction using a monomer (M1) and two monomers (M2), preferably acrylic acid, butyl acrylate and styrene; an acrylic acid salt, butyl acrylate and styrene, copolymers prepared by polymerisation reaction using two monomers (M1) and two monomers (M2), preferably acrylic acid, methacrylic acid, butyl acrylate and styrene; an acrylic acid salt, methacrylic acid, butyl acrylate and styrene, copolymers prepared by polymerisation reaction using a monomer (M1) and a monomer (M3), preferably acrylic acid and 2-acrylamido-2-methylpropane sulphonic acid; an acrylic acid salt and 2-acrylamido-2-methylpropane sulphonic acid; acrylic acid and a 2-acrylamido-2-methylpropane sulphonic acid salt; an acrylic acid salt and a 2-acrylamido-2-methylpropane sulphonic acid salt, copolymers prepared by polymerisation reaction using a monomer (M1) and a monomer (M4), preferably acrylic acid and polyethylene polypropylene glycol methacrylate; an acrylic acid salt and polyethylene polypropylene glycol methacrylate and copolymers prepared by polymerisation reaction using a monomer (M1) and a monomer (M6), preferably acrylic acid and polyethylene glycol methacrylate phosphate; an acrylic acid salt and polyethylene glycol methacrylate phosphate.

In addition to a polymer (P), the dispersing agent according to the invention comprises at least one derivative (S) chosen among an ose (S1), an ose oligomer (S2), a product (S3) and combinations thereof.

According to the invention, the derivative (S1) is an ose that comprises a free hemiacetal group or a hemicetal group condensed between the hydroxyl of the hemiacetal group carried by the anomeric carbon and an OH group of another molecule. Preferably according to the invention, the ose (S1) is chosen among trioses (oses comprising 3 carbon atoms), tetroses (oses comprising 4 carbon atoms), pentoses (oses comprising 5 carbon atoms), hexoses and deoxyhexoses (oses comprising 6 carbon atoms), heptoses (oses comprising 7 carbon atoms), octoses (oses comprising 8 carbon atoms). More preferentially, it is chosen among glyceraldehyde, dihydroxyacetone, erythrose, threose, erythrulose, deoxyribose, ribose, arabinose, xylose, lyxose, ribulose, xylulose, alloxyribose, altrose, galactose, glucose, gulose, idose, mannose, talose, fructose, psicose, sorbose, tagatose, fucose, rhamnose, sedoheptulose, mannoheptulose, heptahydroxyoctanal. Preferably, glucose is used alone or in a mixture.

According to the invention, the derivative (S2) is an oligomer formed from a defined number of oses. Preferably according to the invention, the oligomer (S2) is chosen among ose dimers and ose trimers. More preferentially, it is chosen among dextrose, maltose, lactose, sucrose, maltoriose, maltotetraose, alpha-glucoheptonic acid, beta-glucoheptonic acid. Preferably, sucrose is used alone or in a mixture.

According to the invention, the derivative (S3) is a product resulting from the degradation of a saccharide generally obtained from a ketose that is degraded under defined conditions, leading to a chain rupture at the level of the ketone group. One or several carboxylic acids are generally obtained. Preferably according to the invention, the product (S3) is chosen among aldoses, synthetic monosaccharide derivatives and synthetic disaccharide derivatives. More preferentially, it is chosen among sorbitol, mannitol, gluconic acid, citric acid, isocitric acid, lactic acid, tartaric acid and salts of these acids. Gluconic, citric and tartaric acids are preferred, in particular gluconic acid used alone or in a mixture.

Particularly preferably according to the invention, the derivative (S) is chosen among sorbitol, mannitol, gluconic acid, citric acid, isocitric acid, lactic acid, tartaric acid, salts of these acids, dextrose, maltose, glucose, a mixture of glucose and of maltose, lactose, sucrose, maltoriose, maltotetraose, alpha-glucoheptonic acid, beta-glucoheptonic acid, salts of these acids and combinations of these derivatives.

These various derivatives (S) are generally commercially-available products, for example in crystalline form or in syrup form, such as glucose syrup or corn syrup.

According to the invention, the respective amounts of derivative (S) and of polymer (P) can vary quite significantly. Preferably according to the invention, the (S/P) ratio of the dry weight amounts of derivative (S) and of polymer (P) ranges from 0.1 to 10 or from 0.2 to 5 or from 0.3 to 5. More preferably, this ratio ranges from 0.5 to 4 or from 0.6 to 3. In addition to a dispersing agent, the invention also relates to an aqueous composition that comprises at least such a dispersing agent and a mineral material. Thus, the invention provides an aqueous composition comprising:

(a) at least one dispersing agent according to the invention;

(b) at least one mineral material in particle form.

Many mineral materials can be suitable for the composition according to the invention, in particular according to the nature or according to the form of the mineral material. Preferably, the particles of mineral material have an average diameter of less than 500 μm, less than 200 μm or less than 100 μm or less than 50 μm or even an average diameter ranging from 0.05 μm to 50 μm or an average diameter of less than 10 μm, preferably less than 5 μm or less than 2 μm, also preferentially less than 1 μm or less than 0.5 μm.

According to the invention, a single mineral material (a) or two or three mineral materials (a) are used. Preferably, a single mineral material or two mineral materials are used. Advantageously according to the invention, the mineral material (a) is of synthetic or natural origin. Preferably, it is chosen among the alkaline-earth metal carbonates, preferably calcium carbonate (natural calcium carbonate or precipitated calcium carbonate), strontium carbonate, magnesium carbonate, barium carbonate, dolomite, kaolin, calcined kaolin, titanium dioxide, iron oxide, talcum, calcium sulphate, barium sulphate, silicas, mica, zinc oxide.

More preferentially, it is chosen among calcium carbonate (natural calcium carbonate or precipitated calcium carbonate), titanium oxide, kaolin and calcined kaolin.

In addition to a dispersing agent according to the invention and a mineral material, the composition according to the invention may comprise other elements, in particular according to the technical field in which this composition is used.

Thus, the aqueous composition according to the invention may also comprise at least one bonding agent (c) of natural or synthetic origin. According to the invention, the bonding agent (c) can be a natural bonding agent such as starch, carboxymethyl cellulose (CMC), hydroxyethyl celluloses, polyvinyl alcohol (PV-OH), casein, proteins, alginates.

According to the invention, the bonding agent (c) can also be a synthetic bonding agent such as latex, preferably chosen among a styrene-butadiene polymer, a styrene-acrylic polymer, a styrene-acetate polymer, more preferentially a styrene-butadiene polymer.

The aqueous composition according to the invention may also comprise at least one thickening agent (d) of natural or synthetic origin. It is preferably chosen among a polymeric emulsion, a HASE polymer, an ASE polymer, a HEUR polymer, a polyurethane polymer, a steric thickening polymer, a polyacrylamide polymer, CMC, a CMC derivative and combinations thereof.

The proportions of the various elements of the aqueous composition according to the invention may vary significantly, in particular according to the technical field in which this composition is used.

Preferably, the aqueous composition according to the invention comprises:

from 0.02 to 2% by dry mass of dispersing agent (a),
from 30 to 75% by dry mass of mineral material (b),
from 2 to 25% by dry mass of bonding agent (c),
from 0.01 to 2% by dry mass of thickening agent (d) and
from 22.97 to 42.98% by mass of water.

When used, the aqueous composition according to the invention can be used after dilution, in particular after dilution with water.

More preferably, the aqueous composition according to the invention is a paper coating colour composition.

The aqueous composition according to the invention can also comprise at least one admixture, in particular at least one admixture chosen among dispersing agents, anti-foaming agents, biocides, colouring agents, lubricants and optical brighteners.

The dispersing agent according to the invention is suitable for many uses. Preferably, the dispersing agent according to the invention is used in the preparation of an aqueous composition, preferably in the preparation of an aqueous composition according to the invention.

Thus, the invention also relates to the use of a dispersing agent according to the invention that comprises the addition of the dispersing agent in an aqueous suspension of at least one mineral material in particle form. This use according to the invention may also comprise the addition of at least one mineral material in particle form in an aqueous composition comprising at least one dispersing agent according to the invention.

The invention also relates to the use of at least one dispersing agent according to the invention in the preparation of an aqueous composition chosen among a paper coating colour composition, preferably for the preparation of a primary paper coating layer (pre-coat) or a final paper coating layer (top coat); a coating composition, preferably paint or varnish; an ink composition, preferably an ink composition for an inkjet printer; a care composition, preferably a body or hair care composition; a soil amendment composition. Preferably, this use relates to the preparation of a paper coating colour composition or a coating composition.

Moreover, the invention also provides a method for controlling the rheology of an aqueous composition comprising at least one polymer (P) defined according to the invention by adding to the composition at least one derivative (S) chosen among:

- an ose (S1) comprising from 3 to 8 carbon atoms;
- an ose oligomer (S2) comprising from 1 to 10 ose units;
- a product (S3) resulting from the degradation of a saccharide.

Preferably for this method according to the invention, the (S/P) ratio of the dry weight amounts of derivative (S) and of polymer (P) ranges from 0.1 to 10 or from 0.2 to 5 or from 0.3 to 5. More preferentially, it ranges from 0.5 to 4 or from 0.6 to 3.

More preferably according to the invention for this method according to the invention, the composition comprises at least one ingredient chosen among:

- a mineral material in particle form, preferably a material defined according to the invention;
- a bonding agent, preferably a bonding agent (c) defined according to the invention;
- a thickening agent, preferably a thickening agent (d) defined according to the invention.

The following examples illustrate the various aspects of the invention.

EXAMPLES

Preparation of the Polymers Used According to the Invention and of Comparative Polymers Polymer (P1)

In a 1 L reactor equipped with mechanical stirring, oil bath heating and peristaltic pumps, weigh: 209.7 g of water, 0.08 g of iron sulphate heptahydrate and 0.011 g of copper sulphate pentahydrate. The mixture is then heated to 95° C. and, using the peristaltic pumps, 302.5 g of acrylic acid and 13 g of water, 25.6 g of sodium hypophosphite monohydrate dissolved in 29 g of water, 20.46 g of hydrogen peroxide 130V diluted with 25 g of water are added in 120 minutes. This is then cooked for 60 minutes at 95° C.

The mixture is then cooled, neutralised with 50% sodium hydroxide in water to pH 8.5 and diluted to obtain a dry solids content of 40%. The polymer (P1) sodium polyacrylate with a Mw of 4,400 g/mol is then obtained.

Polymer (P2)

In a 1 L reactor equipped with mechanical stirring, oil bath heating and peristaltic pumps, weigh: 158 g of water, 0.014 g of iron sulphate heptahydrate. The mixture is then heated to 80° C. and, using the peristaltic pumps, the following reagents are simultaneously added while maintaining the temperature at 81+/−1° C.: 271 g of acrylic acid in 210 min, 3.3 g of sodium persulphate dissolved in 44 g of water in 210 min and 114.46 g of a sodium bisulphite solution diluted to 40% by weight in water in 180 min. This is then cooked for 60 min at 80° C. It is then treated with 4.5 g of hydrogen peroxide at 130 V and cooked again for 60 min at 80° C.

The mixture is then cooled, neutralised with 50% sodium hydroxide in water to pH 8.5 and diluted to obtain a dry solids content of 40%. The polymer (P2) sodium polyacrylate with a Mw 2,800 of g/mol is then obtained.

Polymer (P3)

From itaconic acid partially neutralised with sodium hydroxide added slowly, under stirring and at a controlled temperature, then polymerised by heating in water and under stirring in the presence of sodium hypophosphite and of hydrogen peroxide, and finally partially decarboxylated by heating under reflux in water, a polymeric solution (P3) of partially decarboxylated sodium polyitaconate with a concentration of 40% by weight of polymer and a pH of 9 is prepared (method described in the examples in document WO 2015-100412).

The polymer (P3) with a Mw of 2,160 g/mol is obtained.

Polymer (P4)

In a 1 L reactor equipped with mechanical stirring, oil bath heating and peristaltic pumps, weigh: 245 g of water, 0.13 g of iron sulphate heptahydrate and 0.02 g of copper sulphate pentahydrate. The mixture is then heated to 95° C. and, using three separate pumps, a mixture of 284 g of acrylic acid and of 180 g of hydroxypropyl acrylate, 37 g of 130 V hydrogen peroxide diluted with 34 g of water and 96 g of a 50% sodium hypophosphite solution are simultaneously added in 120 minutes. This is then cooked for 60 minutes at 95° C.

The mixture is then cooled, neutralised with a 28° ammonia solution to pH 7 and diluted to obtain a dry solids content of 44%. The polymer (P4) with a Mw of 2,800 g/mol is then obtained.

Polymer (P5)

In a 1 L reactor equipped with mechanical stirring, oil bath heating and peristaltic pumps, weigh: 200 g of isopropanol and 1.7 g of AZDN. The mixture is then heated under reflux to about 80° C. and 200 g of acrylic acid and 81 g of butyl acrylate are added in 120 minutes using the peristaltic pumps. This is then cooked for 60 minutes under reflux. The isopropanol is then distilled and it is gradually replaced with water during distillation.

The mixture is then cooled, neutralised with a 50% potassium hydroxide solution in water to pH 8 and diluted to obtain a dry solids content of 40%. The polymer (P5) with a Mw of 9,000 g/mol is then obtained.

Polymer (P6)

In a 1 L reactor equipped with mechanical stirring, oil bath heating and peristaltic pumps, weigh 260 g of water, then heat to 65° C. and simultaneously add, in 180 min using three separate pumps: a mixture of 50 g of acrylic acid and 343 g of a poly(ethylene glycol-co-propylene glycol) macromonomer methacrylate with a molecular mass of 3,000 g/mol (corresponding on average to 46 units of ethylene oxide and 15 units of propylene oxide, randomly distributed) and ending by a hydroxyl group, 3.6 g of ammonium persulphate dissolved with 80 g of water and 4.5 g of 1,8-dimercapto-3,6-dioxaoctane (DMDO). This is then cooked for 60 minutes while gradually adding a solution of 1 g of sodium persulphate dissolved in 10 g of water.

The mixture is then cooled, neutralised with a 50% sodium hydroxide solution in water to pH 4 and diluted to obtain a dry solids content of 40%. The polymer (P6) with a Mw of 38,000 g/mol is then obtained.

Polymer (P7)

In a 2 L reactor equipped with mechanical stirring, oil bath heating and peristaltic pumps, weigh: 230 g of isopropanol, 230 g of water, 0.005 g of iron sulphate heptahydrate and 0.11 g of hydoxylamine sulphate. The mixture is then heated under reflux to about 80° C. and, using three peristaltic pumps, a mixture comprising 296.8 g of acrylic acid, 164.2 g of an aqueous solution at 50% by weight of sodium 2-acrylamido-2-methylpropanesulphonate is added in 120 minutes, along with 12 g of 130 V hydrogen peroxide diluted in 50 g of water and 3.3 g of hydroxylamine sulphate dissolved in 70 g of water. This is then cooked for 60 minutes under reflux. The isopropanol is then distilled and it is gradually replaced with water during distillation. The mixture is then cooled, neutralised with sodium hydroxide at 50% in water to pH 4 and diluted to obtain a dry solids content of 50%. A polymer (P7) of with a Mw of 5,000 g/mol is then obtained.

Preparation of Dispersing Agents According to the Invention and of Comparative Dispersing Agents A dispersing agent (D1) according to the invention is prepared by mixing the polymer (P1) with the derivative (S1). The polymer (P1) is weighed in a beaker and then the derivative (S1) and water are added, under stirring using a VMI turbine motor 30 at 1,000 rpm. The amounts used are shown in Table 1.

Similarly, other dispersing agents according to the invention are prepared. The following derivatives (S) were used:

- S1-1: glucose syrup at 80% by weight of solids content (CSweet M01658, Cargill),
- S1-2: glucose syrup at 85% by weight of solids content (74/968, Roquette) and
- S1-3: glucose syrup at 91% by weight of solids content (4779, Roquette).

obtained after 10 seconds. The solids content of the agents according to the invention is 42% by weight, with the exception of dispersing agents D12, D13 and D14 which have, respectively, a solids content of 40% by weight, 40% by weight and 44% by weight.

Preparation of Aqueous Compositions of Mineral Materials Comprising the Dispersing Agents According to the Invention or the Comparative Dispersing Agents An aqueous composition according to the invention (C1) is prepared.

The dispersing agent (D2) according to the invention is weighed in a beaker, then water is added followed by a mineral pigment (PM1) while stirring until 2,500 rpm using a VMI stirrer equipped with a 65 mm turbine.

Lastly, sodium hydroxide at 12.5% by weight is added in water until the pH is controlled and stirring is maintained for 20 min. The solids content of the composition is then measured. The respective amounts (g) and content in dispersing agent (% by dry weight relative to the amount of dry pigment) of the different ingredients and the characteristics of the prepared compositions are shown in tables 2 and 3.

Similarly, aqueous compositions (C2) to (C36) according to the invention are prepared as well as comparative compositions (CC1) to (CC14) with no derivative (S) in the dispersing agent used but only a comparative polymer. The pH of the compositions is adjusted to 8.5, with the exception of the pH of aqueous compositions (C33), (C34), (C35) and (C36) according to the invention which is respectively 7, 7, 9 and 9, and of comparative compositions (CC12), (CC13) and (CC14) which is respectively 9, 7 and 7. Dispersing agents (D1) to (D14) according to the invention were used. The following mineral pigments were used:

- PM1: kaolin (Capim DG, Imerys),
- PM2: kaolin (Amazon plus Lump, Kamin),
- PM3: calcium carbonate (Violet label, Omya),
- PM4: precipitated calcium carbonate (SOCAL P3, Solvay),
- PM5: kaolin (Speswhite, Imerys),
- PM6: titanium dioxide (RHD2, Elementis),
- PM7: titanium dioxide (RCL 722, Cristal) and
- PM8: calcined kaolin (Hubertex, Kamin).

TABLE 1

| S3-1: gluconic acid at 48% by weight of solids content (EMF1240, Jungbunzlauer) Dispersing agent | Polymer (P) | Amount of (P) | Derivative (S) | Amount of (S) | (S)/(P) ratio | Amount of water |
|---|---|---|---|---|---|---|
| D1 | P1 | 142.9 | S1-1 | 50 | 40/60 | 45 |
| D2 | P1 | 95.2 | S1-1 | 75 | 60/40 | 68 |
| D3 | P1 | 142.9 | S1-2 | 47.1 | 40/60 | 48 |
| D4 | P1 | 95.2 | S1-2 | 70.6 | 60/40 | 72 |
| D5 | P1 | 142.9 | S3-1 | 80 | 40/60 | 15 |
| D6 | P1 | 95.2 | S3-1 | 120 | 60/40 | 23 |
| D7 | P1 | 142.9 | S1-3 | 43.8 | 40/60 | 51 |
| D8 | P1 | 95.2 | S1-3 | 65.6 | 60/40 | 77 |
| D9 | P2 | 142.9 | S1-1 | 50 | 40/60 | 45 |
| D10 | P3 | 150 | S1-1 | 50 | 40/60 | 50 |
| D11 | P4 | 93 | S1-2 | 75 | 60/40 | 65 |
| D12 | P5 | 125 | S1-2 | 58.8 | 50/50 | 66 |
| D13 | P6 | 100 | S1-2 | 70.6 | 60/40 | 79 |
| D14 | P7 | 100 | S1-2 | 58.8 | 50/50 | 41 |

The final solids content of each dispersing agent is controlled using a CEM microwave scale at 110° C. until a solids content variation of less than 0.1% by weight is The viscosity (mPa·s) of the aqueous suspensions prepared using a Brookfield RVI viscometer is measured at 100 rpm and at 25° C. The results are shown in tables 2 and 3.

TABLE 2

| Composition | Dispersing agent | Dispersing agent - Amount | Dispersing agent - Content | Mineral pigment | Mineral pigment - Amount | Water - Amount | Viscosity |
|---|---|---|---|---|---|---|---|
| C1 | D2 | 0.95 | 0.1 | PM1 | 487 | 52.7 | 670 |
| C2 | D4 | 0.95 | 0.1 | PM1 | 487 | 52.7 | 630 |
| C3 | D6 | 0.95 | 0.1 | PM1 | 487 | 52.7 | 660 |
| C4 | D8 | 0.95 | 0.1 | PM1 | 487 | 52.7 | 640 |
| CC1 | 0 | 0.95 | 0.1 | PM1 | 487 | 52.7 | 900 |
| C5 | D10 | 1.5 | 0.15 | PM1 | 487 | 52.7 | 850 |
| CC2 | 0 | 1.5 | 0.15 | PM1 | 487 | 52.7 | 930 |
| C6 | D1 | 1.9 | 0.2 | PM1 | 487 | 52.7 | 980 |
| C7 | D2 | 1.9 | 0.2 | PM1 | 487 | 52.7 | 600 |
| C8 | D3 | 1.9 | 0.2 | PM1 | 487 | 52.7 | 760 |
| C9 | D4 | 1.9 | 0.2 | PM1 | 487 | 52.7 | 640 |
| C10 | D5 | 1.9 | 0.2 | PM1 | 487 | 52.7 | 1,000 |
| C11 | D6 | 1.9 | 0.2 | PM1 | 487 | 52.7 | 780 |
| C12 | D7 | 1.9 | 0.2 | PM1 | 487 | 52.7 | 690 |
| C13 | D8 | 1.9 | 0.2 | PM1 | 487 | 52.7 | 780 |
| C14 | D10 | 1.9 | 0.2 | PM1 | 487 | 52.7 | 880 |
| CC3 | 0 | 1.9 | 0.2 | PM1 | 487 | 52.7 | 1,350 |
| C15 | D1 | 2.38 | 0.25 | PM1 | 487 | 52.7 | 1,120 |
| C16 | D2 | 2.38 | 0.25 | PM1 | 487 | 52.7 | 620 |
| C17 | D3 | 2.38 | 0.25 | PM1 | 487 | 52.7 | 900 |
| C18 | D4 | 2.38 | 0.25 | PM1 | 487 | 52.7 | 680 |
| C19 | D5 | 2.38 | 0.25 | PM1 | 487 | 52.7 | 1,140 |
| C20 | D6 | 2.38 | 0.25 | PM1 | 487 | 52.7 | 860 |
| C21 | D7 | 2.38 | 0.25 | PM1 | 487 | 52.7 | 730 |
| C22 | D8 | 2.38 | 0.25 | PM1 | 487 | 52.7 | 860 |
| CC4 | 0 | 2.38 | 0.25 | PM1 | 487 | 52.7 | 1,700 |

TABLE 3

| Composition | Dispersing agent | Dispersing agent - Amount | Mineral pigment | Mineral pigment - Amount | Dispersing agent - Content | Water - Amount | Viscosity |
|---|---|---|---|---|---|---|---|
| C23 | D12 | 2.38 | 410.3 | PM2 | 0.25 | 114.3 | 195 |
| C24 | D9 | 2.38 | 410.3 | PM2 | 0.25 | 114.3 | 195 |
| CC5 | 0 | 2.38 | 410.3 | PM2 | 0.25 | 114.3 | 230 |
| C25 | D3 | 0.95 | PM3 | 407.7 | 0.1 | 112 | 100 |
| CC6 | 0 | 0.95 | PM3 | 407.7 | 0.1 | 112 | 110 |
| C26 | D1 | 1.43 | PM3 | 407.7 | 0.15 | 112 | 100 |
| C27 | D3 | 1.43 | PM3 | 407.7 | 0.15 | 112 | 100 |
| CC7 | 0 | 1.43 | PM3 | 407.7 | 0.15 | 112 | 150 |
| C28 | D3 | 3.33 | PM4 | 400 | 0.35 | 187 | 240 |
| CC8 | 0 | 3.33 | PM4 | 400 | 0.35 | 187 | 260 |
| C29 | D13 | 6 | PM4 | 400 | 0.6 | 182.2 | 720 |
| CC9 | 0 | 6 | PM4 | 400 | 0.6 | 182.2 | 830 |
| C30 | D14 | 6.36 | PM4 | 400 | 0.7 | 186 | 304 |
| CC10 | 0 | 6.36 | PM4 | 400 | 0.7 | 186 | 380 |
| C31 | D1 | 1.9 | PM5 | 487 | 0.2 | 52.7 | 460 |
| C32 | D6 | 1.9 | PM5 | 487 | 0.2 | 52.7 | 480 |
| CC11 | 0 | 1.9 | PM5 | 487 | 0.2 | 52.7 | 530 |
| C33 | D12 | 5 | PM6 | 400 | 0.5 | 131 | 80 |
| CC12 | 0 | 5 | PM6 | 400 | 0.5 | 131 | 214 |
| C34 | D11 | 2 | PM7 | 405.7 | 0.5 | 125.75 | 140 |
| CC13 | 0 | 2 | PM7 | 405.7 | 0.5 | 125.75 | 180 |

It was found that the compositions according to the invention have a lower viscosity than the comparative compositions, though they contain a smaller amount of polymer. Moreover, a dilating effect was evaluated by measuring the shear rate ($s^{-1}$) at 25° C. of the aqueous suspensions prepared, using a coaxial Thermofisher RS600 rheometer whose spindle has a CC27 DG Ti geometry while increasing the speed ($s^{-1}$) of the spindle until this spindle is blocked. The results are shown in Table 4.

TABLE 4

| Composition | Dispersing agent | Dispersing agent - Amount | Mineral pigment | Mineral pigment - Amount | Dispersing agent - Content | Water - Amount | Shear rate |
|---|---|---|---|---|---|---|---|
| C35 | D3 | 2 | PM8 | 413.2 | 0.5 | 385.8 | 870 |
| C36 | D4 | 2 | PM8 | 413.2 | 0.5 | 385.8 | 1,180 |
| CC14 | 0 | 2 | PM8 | 413.2 | 0.5 | 385.8 | 800 |

It was found that the dilating effect of the compositions according to the invention is lower than that of the comparative composition. In fact, the compositions according to the invention make it possible to achieve a higher shear rate by the time the spindle blocks.

The invention claimed is:

1. An aqueous composition, comprising, as a dry weight based on total aqueous composition weight:
 (a) a mineral material in particle form, in a range of from 30 to 75%; and
 (b) an aqueous dispersing agent in a range of from 0.02 to 2%, the aqueous dispersing agent comprising:
 water;
 in the water, a polymer (P) prepared by a process comprising radically polymerizing, at a temperature greater than 50° C., a monomer comprising a first anionic monomer (M1) comprising a polymerizable olefinic unsaturation and a carboxylic acid group, optionally in salt form, in a reaction environment comprising hydrogen peroxide, benzoyl peroxide, acetyl peroxide, lauryl peroxide, tert-butyl hydroperoxide, cumene hydroperoxide, ammonium persulfate, an alkali metal persulfate, and/or an azo compound, as a radical-generating compound, optionally as an association comprising a $Fe^{II}$, $Fe^{III}$, $Cu^{I}$, and/or $Cu^{II}$ ion; and
 in the water, a derivative(S) comprising (S1) an ose comprising from 3 to 8 carbon atoms, (S2) an ose oligomer comprising from 1 to 10 ose units, and/or (S3) a product resulting from degradation of a saccharide,
 wherein the aqueous composition has a viscosity of no more than 1.140 mPa·s, measured using a Brookfield RVI viscometer at 100 rpm and 25° C.,
 wherein the monomer comprises the first anionic monomer (M1) in at least 50 wt. %, based on total monomer weight,
 wherein the first anionic monomer (M1) is acrylic acid, methacrylic acid, and/or itaconic acid, optionally in salt form,
 wherein the polymer (P) is at least partially neutralized, and
 wherein an S/P ratio of dry weight amounts of the derivative(S) to the polymer (P) in the water is in a range of from 0.6 to 10.

2. The composition of claim 1, wherein the reaction environment of the radically polymerizing further comprises:
 a first compound comprising phosphorus in oxidation state I;
 a second compound comprising a bisulfite ion;
 a third compound comprising phosphorus in oxidation state III;
 a xanthate derivative, a mercaptan compound, and/or a compound of formula (I), in a range of from 0.05 and 5 wt. %, relative to a total monomer mass:

(I)

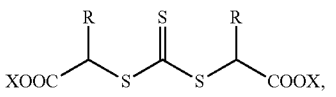

X independently being H, Na, or K, and R independently being a $C_1$-$C_5$-alkyl group; or
 a reducing compound.

3. The composition of claim 1, wherein the first anionic monomer (M1) comprises a further carboxylic acid group.

4. The composition agent of claim 1, wherein the monomer further comprises:
 a second anionic monomer (M1) different from the first monomer (M1);
 a non-ionic monomer (M2) comprising a polymerizable olefinic unsaturation;
 a monomer (M3) comprising 2-acrylamido-2-methylpropanesulfonic acid, a 2-acrylamido-2-methylpropanesulfonic acid salt, 2-(methacryloyloxy) ethanesulfonic acid, a 2-(methacryloyloxy) ethanesulfonic acid salt, sodium methallyl sulfonate, styrene sulfonate, hydroxyethyl-acrylate phosphate, hydroxypropyl-acrylate phosphate, hydroxyethyl methacrylate phosphate, and/or hydroxypropyl-methacrylate phosphate;
 a monomer (M4) of formula (II):

(II)

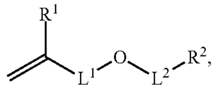

$R^1$ and $R^2$ independently being H or $CH_3$, $L^1$ independently being C(O), $CH_2$, $CH_2—CH_2$, or $O—CH_2—CH_2—CH_2—CH_2$, $L^2$ independently being $(CH_2—CH_2O)_x$, $(CH_2CH(CH_3)O)_y$, and/or $(CH(CH_3)CH_2O)_2$, and x, y, and z independently being an integer or decimal in a range of from 0 to 150 with a sum of x, y, and z being in a range of from 10 to 150;
 a compound (M5) of formula (III):

$$R^1\text{-}(EO)_m\text{-}(PO)_n—R^2 \quad \text{(III)},$$

m and n independently being 0 or an integer or decimal less than 150 with m or n being different from 0, EO being $CH_2CH_2O$, PO independently being $CH(CH_3)\ CH_2O$ or $CH_2CH(CH_3)O$, $R^1$ being a group comprising a polymerizable olefinic unsaturation, and $R^2$ being a hydrocarbon group comprising from 6 to 40 carbon atoms;
 a monomer (M6) comprising polyalkylene glycol acrylate, polyalkylene glycol methacrylate, allyl polyalkylene glycol, methallyl polyalkylene glycol, 3-methyl-3-buten-1-ylpolyalkylene glycol, polyalkylene glycol acrylate phosphate, polyalkylene glycol methacrylate phosphate, allyl polyalkylene glycol phosphate, methallyl polyalkylene glycol phosphate, and/or 3-methyl-3-buten-1-ylpolyalkylene glycol phosphate, and/or
 a monomer (M7) comprising a cross-linking compound and/or a monomer comprising a first and a second olefinic unsaturation.

5. The composition of claim 1, wherein the ose (S1) comprises triose, tetrose, pentose, hexose, deoxyhexose, heptose, and/or octose;
 wherein the oligomer (S2) comprises an ose dimer and/or an ose trimer; and
 wherein product (S3) comprises an aldose, a synthetic monosaccharide derivative, and/or synthetic disaccharide derivative.

6. The composition of claim 1, wherein the derivative (S) comprises sorbitol, mannitol, gluconic acid, citric acid, isocitric acid, lactic acid, tartaric acid, dextrose, maltose, glucose, maltose, lactose, sucrose, maltoriose, maltotetraose, alpha-glucoheptonic acid, and/or beta-glucoheptonic acid, optionally in salt form.

7. The composition of claim 1, wherein particles of the mineral material (b) have an average diameter of less than 500 μm; or wherein the mineral material (b) consists of one, two, or three mineral materials.

8. The composition of claim 1, further comprising:

(c) a bonding agent comprising starch, carboxymethyl cellulose, hydroxyethyl cellulose, polyvinyl alcohol, casein, a further protein, and/or alginate.

9. The composition of claim 1, further comprising, relative to total aqueous composition mass:

(c) a bonding agent in a range of from 2 to 25% by dry mass;

(d) a thickening agent in a range of from 0.01 to 2% by dry mass; and the water in a range of from 22.97 to 42.98% by mass.

10. The composition of claim 1, further comprising:

a dispersing agent, an antifoaming agent, a biocide, a coloring agent, a lubricant, and/or an optical brightener.

11. A method for preparing the aqueous composition of claim 1, the method comprising:

in an aqueous suspension, contacting the aqueous dispersing agent and the mineral material in particle form.

12. The composition of claim 1, configured as a paper coating color composition.

13. A method for controlling rheology of an aqueous composition, the method comprising:

combining a first aqueous composition and the aqueous dispersing agent to obtain the aqueous composition of claim 1.

14. The agent of claim 1, wherein the polymer (P) comprises:

the first anionic monomer (M1) is present in the polymer (P) in a range of from more than 70 to 99.5 wt. %; and a further monomer in a range of from 0.5 to 30 wt. %.

15. An aqueous dispersing agent, comprising:

a polymer (P), comprising, in radically polymerized form, a first anionic monomer (M1) comprising acrylic acid, methacrylic acid, and/or itaconic acid, optionally in salt form; and a derivative(S) comprising (S1) an ose comprising from 3 to 8 carbon atoms, (S2) an ose oligomer comprising from 1 to 10 ose units, and/or (S3) a product resulting from degradation of a saccharide, wherein an S/P ratio of dry weight amounts of the derivative(S) to the polymer (P) in the water is in a range of from 0.6 to 10, wherein the first anionic monomer (M1) is present in the polymer (P) in more than 70 wt. %, and wherein the polymer (P) is at least partially neutralized.

16. The composition of claim 15, wherein the first anionic monomer (M1) is present in the polymer (P) in at least 99.5 wt. %.

17. The composition of claim 1, configured as a paper pre-coat formulation, a paper top coat formulation, a paint, a varnish, an ink composition.

18. The composition of claim 1, wherein the aqueous composition has a viscosity of no more than 720 mPa's, measured using a Brookfield RVI viscometer at 100 rpm and 25° C.

19. A paper pre-coat formulation, a paper top coat formulation, a paint, a varnish, an ink composition, comprising, relative to total aqueous composition mass:

(a) the aqueous dispersing agent of claim 15 in a range of from 0.02 to 2% by dry mass;

(b) a mineral material in a range of from 30 to 75% by dry mass;

(c) a bonding agent in a range of from 2 to 25% by dry mass;

(d) a thickening agent in a range of from 0.01 to 2% by dry mass; and the water in a range of from 22.97 to 42.98% by mass, wherein the mineral agent comprises calcium carbonate, strontium carbonate, magnesium carbonate, barium carbonate, dolomite, kaolin, calcined kaolin, titanium dioxide, iron oxide, talcum, calcium sulfate, barium sulfate, silica, mica, and/or zinc oxide.

20. The composition of claim 1, further comprising:

(d) a thickening agent.

* * * * *